United States Patent
Rowe et al.

(10) Patent No.: US 9,260,312 B2
(45) Date of Patent: Feb. 16, 2016

(54) STABLE COMPLEXES OF NON-METAL ELEMENTS AND HYDRIDE AS NOVEL REAGENTS

(71) Applicant: Toyota Motor Engineering & Manufacturing North America, Inc., Erlanger, KY (US)

(72) Inventors: Michael P. Rowe, Pinckney, MI (US); Ryan Daniel Desautels, Winnipeg (CA)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 41 days.

(21) Appl. No.: 14/269,909

(22) Filed: May 5, 2014

(65) Prior Publication Data
US 2015/0098886 A1    Apr. 9, 2015

Related U.S. Application Data

(63) Continuation-in-part of application No. 14/046,081, filed on Oct. 4, 2013, now Pat. No. 8,980,219, and a continuation-in-part of application No. 14/219,823, filed on Mar. 19, 2014.

(51) Int. Cl.
*C01B 35/02* (2006.01)
*C01B 6/02* (2006.01)
*C01B 6/06* (2006.01)
*C01B 6/24* (2006.01)

(52) U.S. Cl.
CPC . *C01B 35/02* (2013.01); *C01B 6/02* (2013.01); *C01B 6/06* (2013.01); *C01B 6/246* (2013.01)

(58) Field of Classification Search
CPC ............... C01B 35/02; C01B 6/02; C01B 6/06
USPC ........................................ 423/644; 241/26, 27
See application file for complete search history.

(56) References Cited

U.S. PATENT DOCUMENTS 7,041,350 B1    5/2006  Rule et al.

FOREIGN PATENT DOCUMENTS

| JP | 2011122202 | 6/2011 |
| WO | 2012007830 A1 | 1/2012 |
| WO | WO 2012007830 A1 * | 1/2012 |

OTHER PUBLICATIONS

Schüth et al. "Light metal hydrides and complex hydrides for hydrogen storage", 2004, Chem. Commn., 2249-2258.*
Rowe et al., "Stable Complexes of Zero-Valent Metal and Hydride as Novel Reagents" U.S. Appl. No. 14/046,0861, filed Oct. 4, 2014.
(Continued)

*Primary Examiner* — Stanley Silverman
*Assistant Examiner* — Syed Iqbal
(74) *Attorney, Agent, or Firm* — Christopher G. Darrow; Darrow Mustafa PC

(57) ABSTRACT

A reagent and its method of production are provided. The reagent includes at least one zero-valent atom, whether metal, metalloid, or non-metal, in complex with at least one hydride molecule. The method of production includes ball-milling a mixture which includes an elemental (i.e. zero-valent) material and a hydride. In some cases, the elemental material is a non-metal such as carbon. The reagent can be useful as a reagent for the synthesis of elemental nanoparticles composed of zero-valent metal, metalloid, or non-metal.

20 Claims, 12 Drawing Sheets

(56) References Cited

OTHER PUBLICATIONS

Rowe et al., "Stable Complexes of Zero-Balent Metallic Element and Hydride as Novel Reagents" U.S. Appl. No. 14/219,823, filed Mar. 19, 2014.
Rowe, "Stable Complexes of Multiple Zero-Valent Metals and Hydride as Novel Reagents". U.S. Appl. No. 14/219,815, filed Mar. 19, 2014.
Rowe, "Stable Complexes of Zero-Valent Metallic Element and Hydride as Novel Reagents". U.S. Appl. No. 14/269,895, filed May 5, 2014.
Chen et al., "Improved Dehydrogenation Properties of $Ca(BH_4)_2 \cdot nNH_3$ (n = 1, 2, and 4) Combined with $Mg(BH_4)_2$,", Sep. 2012, J. Phys. Chem., 116, 21162-21168.
Imamura et al., "Dehydriding of $Sn/MgH_2$ nanocomposite formed by ball milling of $MgH_2$ with Sn", Jul. 2007, Int. J. Hydrogen Energy, 32, 4191-4194.
Schütch et al, "Light metal hydrides and complex hydrides for hydrogen storage", 2004, Chem. Commun., pp. 2249-2258.
Wronski et al., "A new nanonickel catalyst for hydrogen storage in solid-state magnesium hydrides", 2011, Int. J. Hydrogen Energy, 36, pp. 1159-1166.

* cited by examiner

STABLE COMPLEXES OF NON-METAL ELEMENTS AND HYDRIDE AS NOVEL REAGENTS

CROSS-REFERENCE TO RELATED APPLICATIONS

This application is a continuation-in-part of application Ser. No. 14/046,081, filed 4 Oct. 2013, and a continuation-in-part of application Ser. No. 14/219,823, filed 19 Mar. 2014, each of which is herein incorporated by reference in its entirety.

TECHNICAL FIELD

The present invention relates in general to a composition of matter composed of zero-valent metallic element in stable complex with one or more hydride molecules and in particular to zero-valent manganese or tin in complex with lithium borohydride, and also to a method for synthesizing the complex.

BACKGROUND

Hydrides, compounds in which metals or metalloids are bound directly to hydrogen, are relatively energetic molecules with a large variety of known and developing applications in chemistry and energy technology. Such applications include uses as reducing agents, hydrogenation catalysts, desiccants, potent bases, components in rechargeable batteries, and potentially as solid hydrogen storage vehicles in fuel cell technology.

Metal nanoparticles, particles of elemental metal in pure or alloyed form with a dimension less than 100 nm, have unique physical, chemical, electrical, magnetic, optical, and other properties in comparison to their corresponding bulk metals. As such they are in use or under development in fields such as chemistry, medicine, energy, and advanced electronics, among others.

Synthetic methods for metallic nanoparticles are typically characterized as being "top-down" or "bottom-up" and comprise a variety of chemical, physical, and even biological approaches. Top-down techniques involve the physical breakdown of macroscale metallic particles, using a variety of energy inputs, into nanoscale particles. Bottom-up methods involve the formation of nanoparticles from isolated atoms, molecules, or clusters.

Physical force methods for top-down metal nanoparticle synthesis have included milling of macroscale metal particles, laser ablation of macroscale metals, and spark erosion of macroscale metals. Chemical approaches to bottom-up synthesis commonly involve the reduction of metal salt to zero-valent metallic element with nucleation seed particles or self-nucleation and growth into metal nanoparticles.

While each of these methods can be effective in certain circumstances, each also has disadvantages or situational inapplicability. Direct milling methods can be limited in the size of particles obtainable (production of particles smaller than ~20 nm is often difficult) and can lead to loss of control of the stoichiometric ratios of alloys. Other physical methods can be expensive or otherwise unamenable to industrial scale. On the other hand, chemical reduction techniques can fail, for example in situations where metallic cations are resistant to chemical reduction. Mn(II) for example is virtually impervious to in situ chemical reduction, making this approach inapplicable to the preparation containing $Mn^0$, or $Mn^0$-containing, nanoparticles.

Non-metallic nanoparticles have been generally less well studied than metal nanoparticles, but techniques for synthesizing them have been developed in certain situations. Similar to metal nanoparticles, non-metallic nanoparticles also have spectroscopic and other properties differing substantially from those of the bulk elements, such as the fluorescence of carbon nanoparticles.

A single synthetic methodology, capable of producing high-purity elemental nanoparticles of any composition, whether metal, metalloid, or non-metal would be useful.

SUMMARY

A composition of zero-valent metallic element in complex with hydride and a method of synthesizing the composition are provided.

In one aspect, a reagent complex is disclosed. The reagent complex comprises a complex according to Formula I:

$$Q^0 \cdot X_y \qquad \qquad \text{I,}$$

wherein $Q^0$ is a zero-valent element, X is a hydride, and y is an integral or fractional value greater than zero. In some variations, the zero-valent element is a non-metal while in other variations the zero-valent element is a metal or metalloid. In two particular examples in which the zero-valent element is a non-metal, it is selenium or carbon. In some instances, the hydride can be lithium borohydride, and y can be one or two.

In another aspect, a method for synthesizing a reagent complex is disclosed. The method includes a step of ball-milling a mixture which includes both a hydride and a preparation containing a zero-valent element. In different variations, the zero-valent element can be a non-metal or a metallic element and the hydride can be a complex metalloid hydride. In some specific instances, the zero-valent element is a carbon or selenium and the hydride is lithium borohydride.

In another aspect a composition is provided, the composition including a reagent complex synthesized by a method comprising ball-milling a mixture which includes both a hydride and a preparation containing a zero-valent element.

BRIEF DESCRIPTION OF THE DRAWINGS

Various aspects and advantages of the invention will become apparent and more readily appreciated from the following description of the embodiments taken in conjunction with the accompanying drawings, of which.

DETAILED DESCRIPTION

Figure 1A:
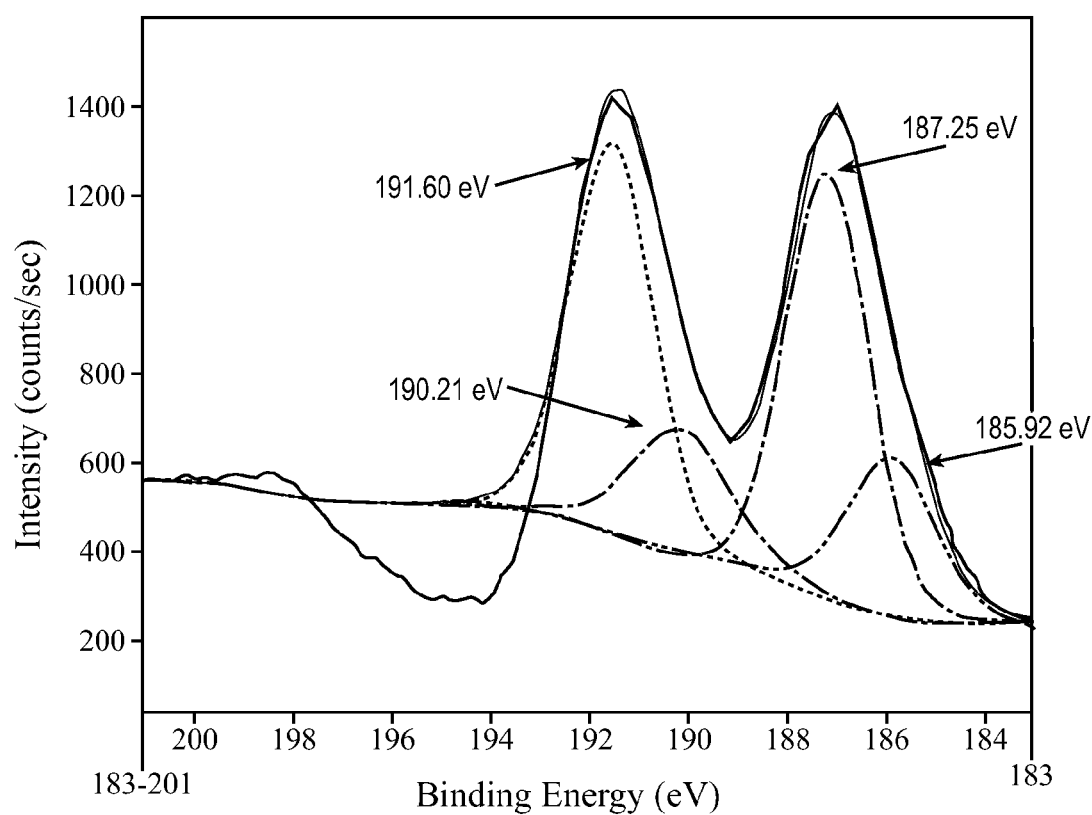
FIG. 1A is a boron x-ray photoelectron spectrum of a $LiBH_4$.

The chemical compositions provided herein can have substantial utility in the "wet chemistry" synthesis of high purity, elemental nanoparticles. Reagents suitable for synthesizing metal, metalloid, or non-metal nanoparticles are disclosed. The disclosed methods for preparing the chemical compositions are straightforward and reproducible. Further, and as disclosed herein, the methods are capable of producing reagents which incorporate any of a broad range of elements. The elements, or "zero-valent" elements incorporated into the chemical compositions of the disclosure include essentially any solid element, whether metal, metalloid, or non-metal.

Chemical compositions of the present disclosure generally include a zero-valent element in complex with a hydride molecule. These compositions can be prepared by utilizing the disclosed methods, which generally include the act of ball-milling, together, an elemental material with a hydride.

As the term will be used herein, "zero-valent" or "zero-valent element" refers to the condition of being in oxidation state zero. The term can alternatively be defined as describing the condition of being neither ionized nor covalently associated with other species. More generically, the phrase "zero-valent" as used herein refers to the condition of the material so described of being in elemental form.

As used herein, the term "element" refers to any element of the periodic table, in zero-valent form. In particular, it refers to any element which, in its zero-valent form, is a solid under the conditions of use. More particularly still, the term "element", as used herein, refers to any element which is solid under standard conditions of temperature and pressure.

The phrase "metallic element" refers to a metal, a lanthanide, or a metalloid. A "metal" can refer to an alkaline earth metal, an alkali metal, a transition metal, or a post-transition metal. The phrase "transition metal" can refer to any D-block metal of Groups 3 through 12. The phrase "post-transition metal" can refer to Group 13 through 16 metals. The term "metalloid" can refer to any of boron, silicon, germanium, arsenic, antimony, tellurium, or polonium.

As used here, the phrases "non-metallic element" and "non-metal" refer to any non-metallic element, especially any non-metallic element which is generally a solid at standard conditions of temperature and pressure. In particular, the phrases "non-metallic element" and "non-metal" refer to any of carbon, phosphorous, sulfur, and selenium.

As used here, the term "hydride" refers generally to any molecular species capable of functioning as a hydrogen anion donor. In different instances, a hydride as referenced herein can be a binary metal hydride (e.g. NaH, or MgH$_2$), a binary metalloid hydride (e.g. BH$_3$), a complex metal hydride (e.g. LiAlH$_4$), or a complex metalloid hydride (e.g. LiBH$_4$ or Li(CH$_3$CH$_2$)$_3$BH). In some examples the hydride will be LiBH$_4$. The term hydride as described above can in some variations include a corresponding deuteride or tritide.

A reagent complex is disclosed, comprising a complex according to Formula I:

$$Q^0 . X_y \qquad \qquad \text{I,}$$

wherein Q$^0$ is a zero-valent element, wherein X is a hydride, and wherein y is an integral or fractional value greater than zero. In some variations, the zero-valent element, Q$^0$, can be a non-metal and in other variations it can be a metallic element.

For example in some variations, the reagent complex comprises a complex according to Formula II:

$$D^0 . X_y \qquad \qquad \text{II,}$$

wherein D$^0$ is a zero-valent non-metallic element, wherein X is a hydride, and wherein y is an integral or fractional value greater than zero. In other variations, the reagent complex further comprises a complex according to Formula III:

$$E^0 . X_y \qquad \qquad \text{III,}$$

wherein E$^0$ is a zero-valent metallic element, wherein X is a hydride, and wherein y is an integral or fractional value greater than zero. It is thus to be understood that Formulae II and III are species of Formula I.

In certain more particular variations of a reagent complex comprising a complex according to Formula III, the metallic element can be a metal, and the reagent complex can be described by Formula IV, $$M^0 . X_y \qquad \qquad \text{IV,}$$

wherein M$^0$ is a zero-valent metal, wherein X is a hydride, and wherein y is an integral or fractional value greater than zero. It is thus to be understood that Formula IV is a species of Formula III.

The value y according to Formula I defines the stoichiometry of hydride molecules to zero-valent elemental atoms in the reagent complex. The value of y can include any integral or fractional value greater than zero. In some instances, 1:1 stoichiometry wherein y equals 1 may be useful. In other instances, a molar excess of hydride to zero-valent element, for example where y equals 2 or 4 may be preferred. A molar excess of hydride to zero-valent element can, in some instances, ensure that there is sufficient hydride present for subsequent applications.

The reagent complexes of the present disclosure can have any supramolecular structure, or no supramolecular structure. No structural details are implied by any of Formulae I-IV. Without being bound to any particular structure, and without limitation, the reagent complex could exist as a supramolecular cluster of many zero-valent elemental atoms interspersed with hydride molecules. The reagent complex could exist as a cluster of zero-valent elemental atoms in which the cluster is surface-coated with hydride molecules. The reagent complex could exist as individual zero-valent elemental atoms having little to no molecular association with one another, but each being associated with hydride molecules according to Formula I. Any of these microscopic structures, or any other consistent with Formula I, is intended to be within the scope of the present disclosure.

A method for synthesizing a reagent includes a step of ball-milling a mixture which includes both a hydride and a preparation containing a zero-valent element. The resulting reagent, alternatively referred to herein as a reagent complex, comprises a complex according to Formula I:

$$Q^0 . X_y \qquad \qquad \text{I,}$$

wherein $Q^0$ is at least one atom in oxidation state zero, derived from the preparation containing a zero-valent element, wherein X is a hydride molecule, and wherein y is an integral or fractional value greater than zero.

In different variations of the method, the zero-valent element can be a non-metal or a metallic element. In some versions of the latter, the zero-valent element can be a metal. Thus, the reagent complex resulting from the ball-milling step can more particularly comprise a complex according to any of Formulae II-IV:

$$D^0 . X_y \qquad \qquad \text{II,}$$

$$E^0 . X_y \qquad \qquad \text{III,}$$

$$M^0 . X_y \qquad \qquad \text{IV,}$$

wherein $D^0$ is at least one non-metal atom in oxidation state zero, derived from a preparation containing a zero-valent non-metal, wherein $E^0$ is at least one atom of a metallic element in oxidation state zero, derived from a preparation containing a zero-valent metallic element, wherein $M^0$ is at least one metal atom in oxidation state zero, derived from a preparation containing a zero-valent metal, and wherein X and y are as defined above.

The preparation containing a zero-valent element, whether the zero-valent element is a non-metal, metallic element, or a metal, can be any composition consisting substantially of the zero-valent element. In many instances the preparation containing a zero-valent element will include zero-valent element in a form which possesses a high surface-area-to-mass ratio. In some instances the zero-valent element will be present in a powder form with a particulate size of −325 mesh. It is contemplated that the preparation containing a zero-valent element can be a highly porous zero-valent element, a zero-valent element with a honeycomb structure, or some other preparation with a high surface-area-to-mass ratio.

It is contemplated that the phrase "high-surface-area-to-mass ratio" can encompass a broad range of surface-area-to-mass ratios and that, in general, the surface-area-to-mass ratio of the preparation containing a zero-valent element employed will be that which is required by the time constraints of the method for synthesizing a reagent. In general, a higher surface-area-to-mass ratio of the preparation containing a zero-valent element will lead to a more rapid completion of the method for synthesizing a reagent. In cases in which the preparation containing a zero-valent element is composed of a powder of a zero-valent element, smaller particle size of the powder of a zero-valent element will lead to a more rapid completion of the method for synthesizing a reagent.

In some variations of the method for synthesizing a reagent, the hydride and the preparation containing a zero-valent element can be present during the ball-milling step in a 1:1 stoichiometric ratio of hydride molecules to metal atoms contained in the preparation containing a zero-valent element. In other variations the stoichiometric ratio can be 2:1, 3:1, 4:1 or higher. In some variations the stoichiometric ratio of hydride to elemental metal atoms in the preparation containing a zero-valent element can also include fractional quantities, such as 2.5:1.

Referring now to FIGS. 1-9, the following spectroscopic data illustrate some properties of reagent complexes of the present disclosure. The spectroscopic data in some cases also illustrate properties of example materials that can be used in the method for synthesizing a reagent complex. In all instances, reagent complexes were prepared by the disclosed method for synthesizing a reagent complex.

Figure 1B:
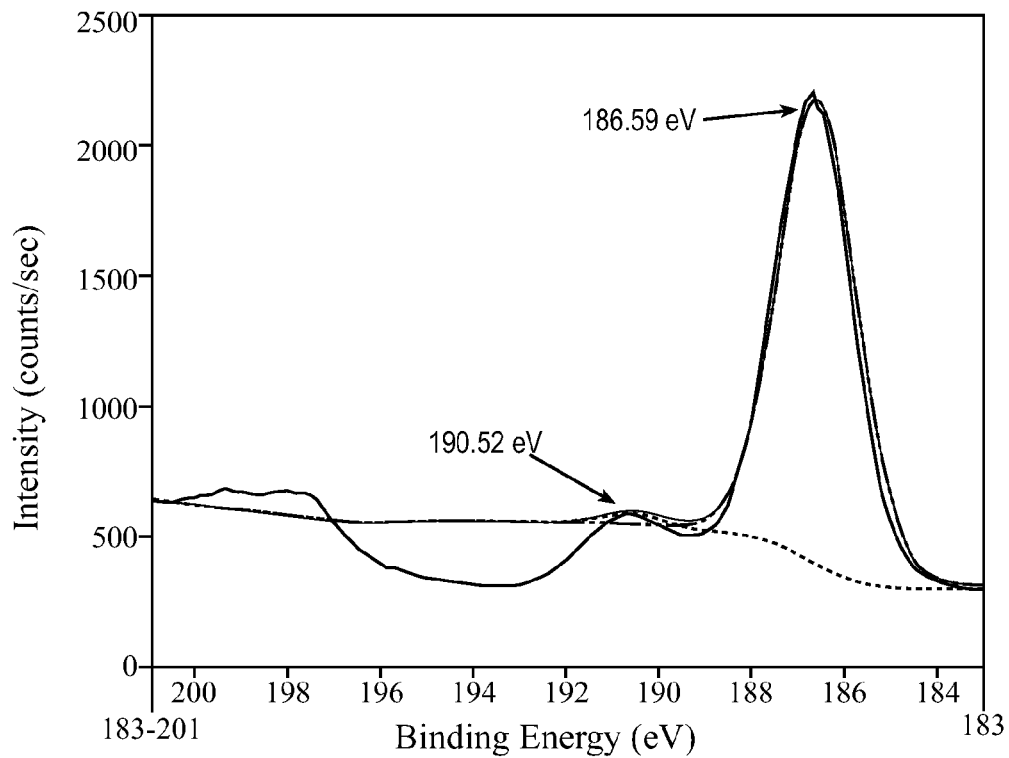
FIG. 1B is a boron x-ray photoelectron spectrum of a $Mn \cdot LiBH_4$ complex synthesized by a disclosed method for synthesizing a reagent complex.
Figure 1C:
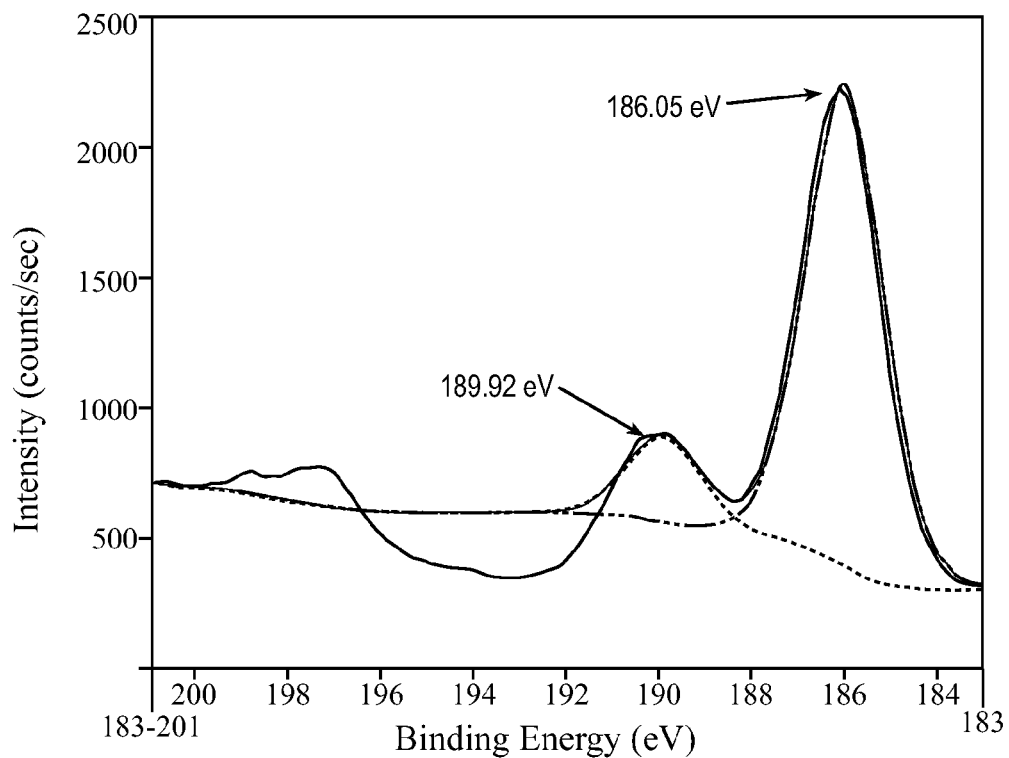
FIG. 1C is a boron x-ray photoelectron spectrum of a $Mn \cdot (LiBH_4)_2$ complex synthesized by the disclosed method for synthesizing a reagent complex.

FIG. 1A shows an x-ray photoelectron spectroscopy (XPS) scan in the boron region of a hydride ($LiBH_4$) which is not incorporated into a reagent complex. FIGS. 1B and 1C show analogous boron XPS scans of reagent complexes $Mn.LiBH_4$ and $Mn.(LiBH_4)_2$, respectively. Heavy solid lines show the raw XPS data while light solid lines show adjusted data. Dashed and/or dotted lines show deconvoluted individual peaks. The uncomplexed $LiBH_4$ of FIG. 1A shows two large peaks centered at 191.60 and 187.25 eV and two smaller peaks centered at 190.21 and 185.92 eV.

Comparing now FIG. 1B to FIG. 1A, ball-milling of the $LiBH_4$ with an equimolar quantity of a preparation containing zero-valent manganese virtually eliminates three of the boron peaks, with only a peak centered at 186.59 eV remaining. The change in boron XPS spectrum of the $LiBH_4$, resulting from ball-milling with the preparation containing a zero-valent element, can be taken as indicative of formation of a complex according to Formula I. As shown by comparison to FIG. 1C, ball-milling of $LiBH_4$ with a 2-fold molar excess of zero-valent manganese, instead of an equimolar quantity, leads to re-emergence of a boron peak centered at 189.92 eV. This could indicate that a portion of $LiBH_4$ is uncomplexed.

Figure 2A:
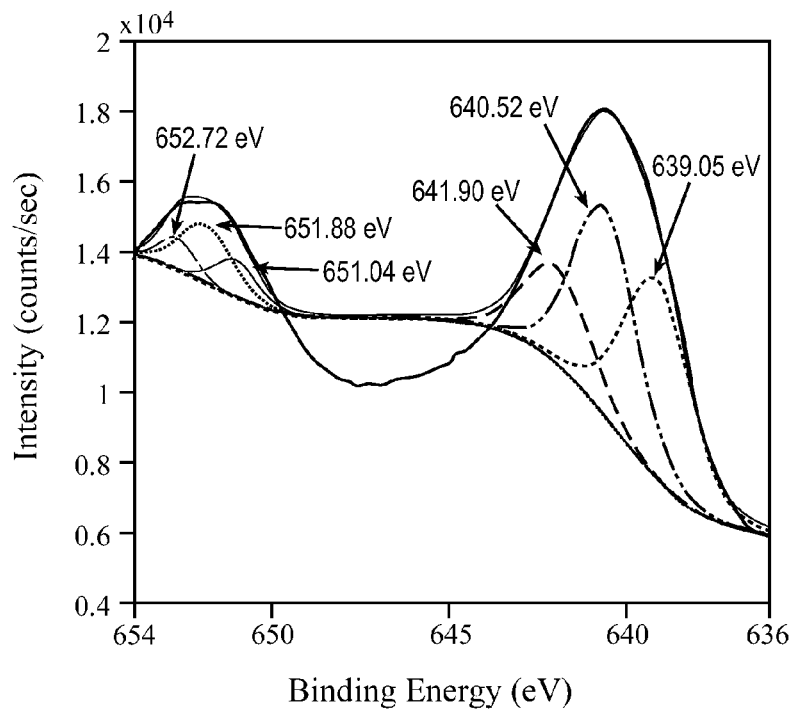
FIG. 2A is a manganese x-ray photoelectron spectrum of $Mn^0$ powder.
Figure 2B:
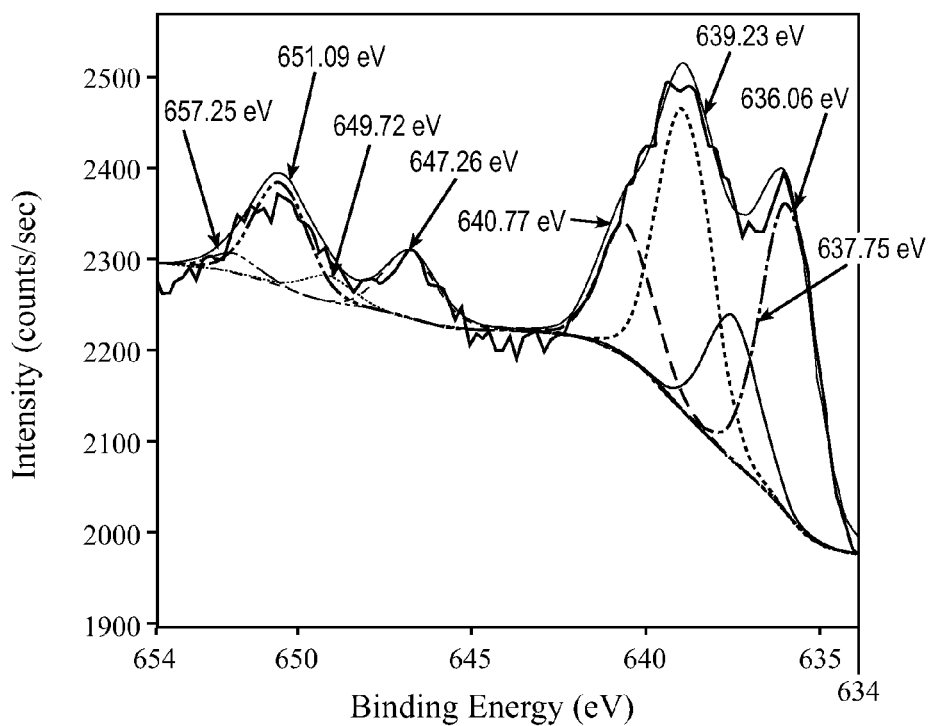
FIG. 2B is a manganese x-ray photoelectron spectrum of a $Mn \cdot (LiBH_4)_2$ complex synthesized by the disclosed method for synthesizing a reagent complex.

FIG. 2A shows an XPS scan of manganese powder. FIG. 2B shows a manganese-region XPS scan of $Mn.(LiBH_4)_2$. Heavy solid lines again show the raw XPS data while light solid lines show adjusted data. Dashed and/or dotted lines show deconvoluted individual peaks. As seen in FIG. 2A, the spectrum of manganese powder includes two broad peaks, each consisting of three component peaks observable after deconvolution. Referring again to FIG. 2A and focusing on the spectral region from ~639-642 eV, the three component peaks for the manganese powder can be assigned, based on published references, to manganese-oxide species (640.52 eV and 641.90 eV) and to zero-valent manganese (639.05 eV). The ball-milled reagent complex represented in FIG. 2B has lost the oxide peak at 641.90 eV but retains the oxide peak (the 640.77 eV peak of FIG. 2B is identifiable with the 640.52 eV peak of FIG. 2A after negligible shifting). The ball-milled reagent complex also retains the zero-valent manganese peak at 639.05 eV (after negligible shifting).

Figure 2C:
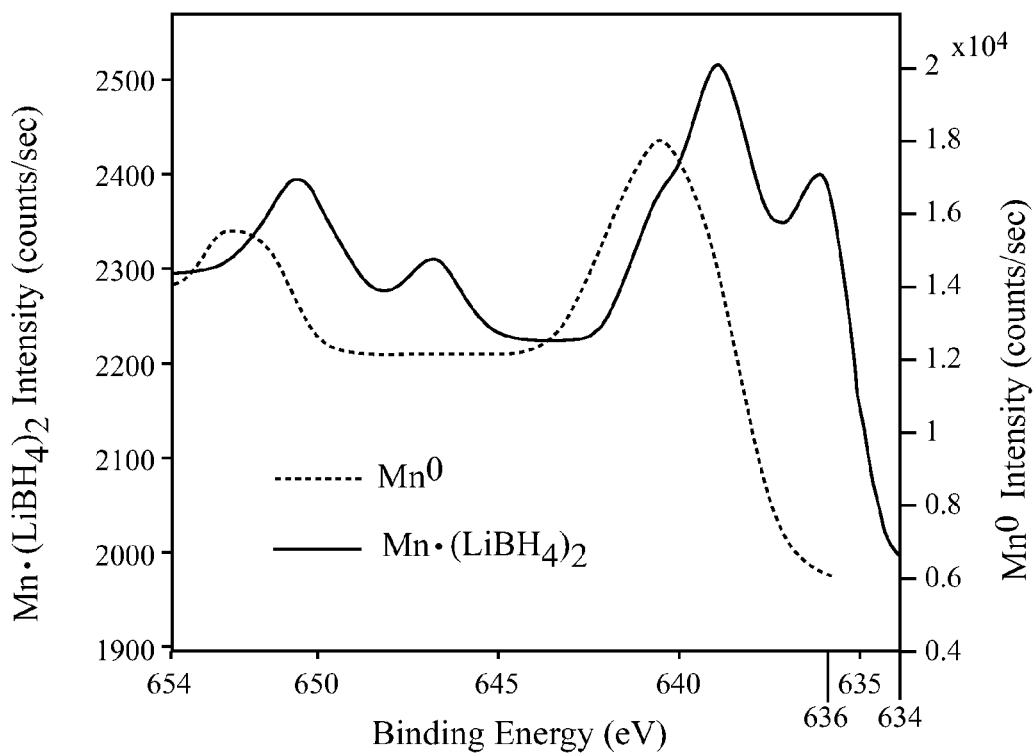
FIG. 2C is an overlay of the x-ray photoelectron spectrum of $Mn^0$ powder of FIG. 2A and the x-ray photoelectron spectrum of a $Mn \cdot (LiBH_4)_2$ complex of FIG. 2B.

Of significance in the spectrum of FIG. 2B, the ball-milled reagent complex displays a new phase with component peaks at 637.75 eV and 636.06 eV. These latter two can be assigned to manganese in complex with the hydride. An overlay of the acquired manganese XPS data for manganese powder and ball-milled Mn.(LiBH$_4$)$_2$ reagent complex is shown in FIG. 2C. The comparison illustrates the loss of at least one manganese-oxide peak and the appearance of the new phases, resulting in a general shift toward lower electronic binding energies.

Figure 3A:
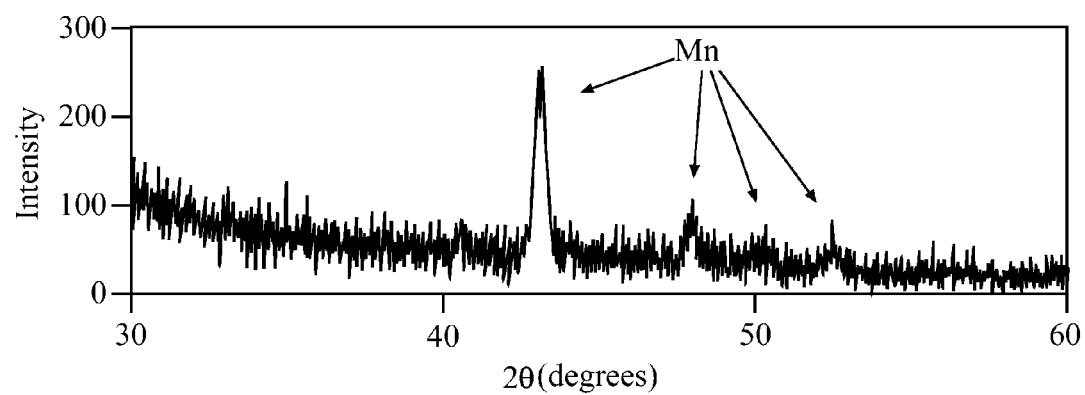
FIG. 3A is an x-ray powder diffraction scan of a $Mn \cdot LiBH_4$ complex synthesized by the disclosed method for synthesizing a reagent complex.
Figure 3B:
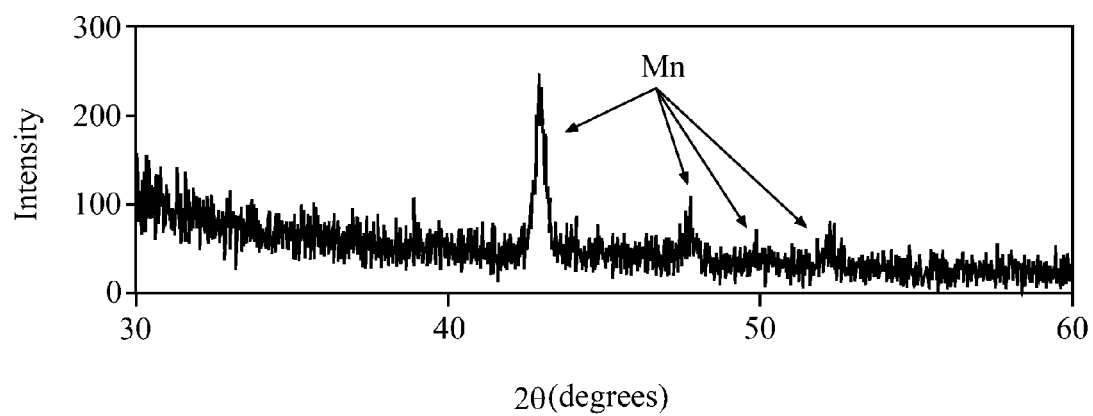
FIG. 3B is an x-ray powder diffraction scan of a Mn.(LiBH$_4$)$_2$ complex synthesized by the disclosed method for synthesizing a reagent complex.

FIGS. 3A and 3B show XRD spectra of the Mn.LiBH$_4$ and Mn.(LiBH$_4$)$_2$ reagent complexes of FIGS. 1B and 1C, respectively. Both diffraction analyses suggest the samples are largely amorphous, as indicated by the general absence of peaks. Minor peaks consistent with 20 nm manganese metal are observed, while no peaks consistent with LiBH$_4$ or manganese oxide are evident.

Figure 4:
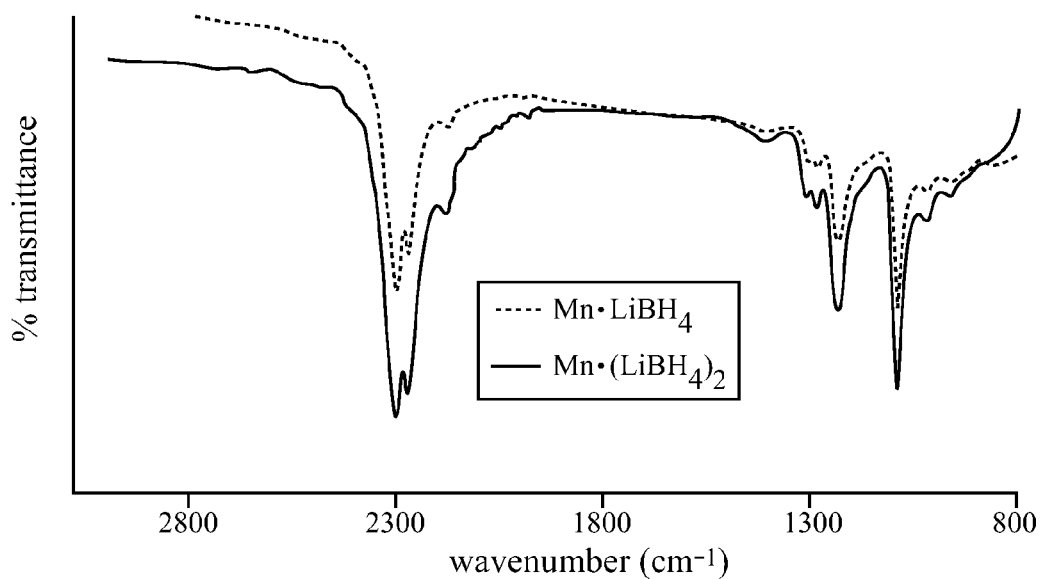
FIG. 4 is an overlay of an FT-IR spectrum of a Mn.LiBH$_4$ complex synthesized by the method of FIG. 1 and an Mn.(LiBH$_4$)$_2$ complex synthesized by the disclosed method for synthesizing a reagent complex.

An overlay of FT-IR scans for reagent complexes Mn.LiBH$_4$ and Mn.(LiBH$_4$)$_2$ is seen in FIG. 4. Both spectra have dominant features at 2299, 1230, and 1092 cm$^{-1}$ corresponding to IR-active modes of BH$_4^-$. This result suggests that the tetrahedral structure of the BH$_4^-$ is essentially unperturbed by incorporation of LiBH$_4$ into the reagent complex.

Figure 5A:
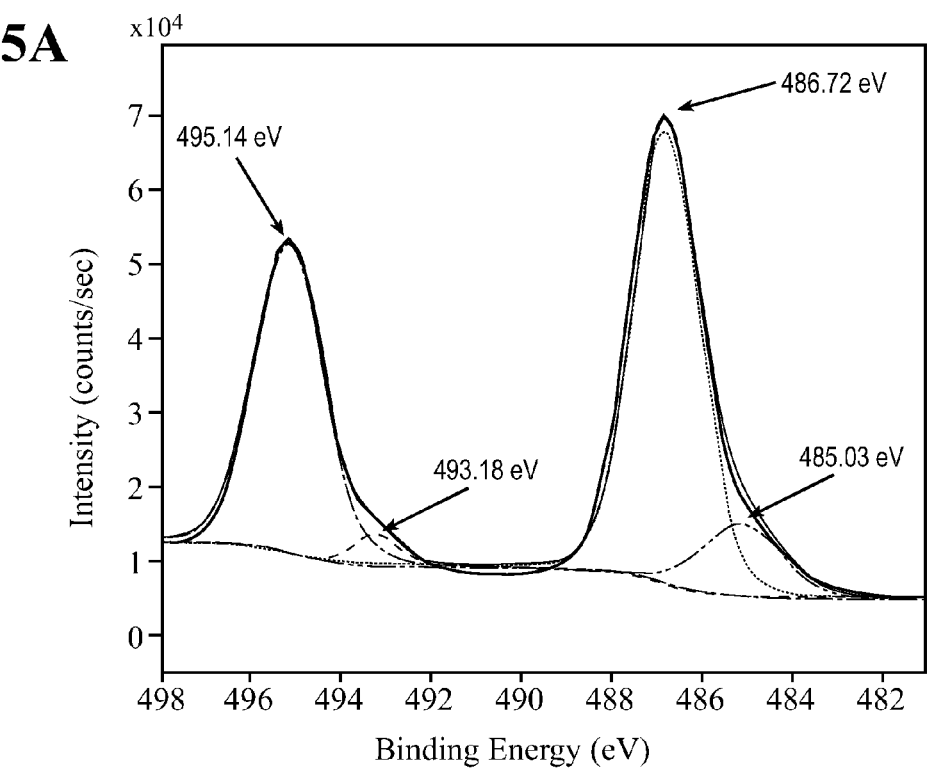
FIG. 5A is a tin x-ray photoelectron spectrum of Sn$^0$ powder.
Figure 5B:
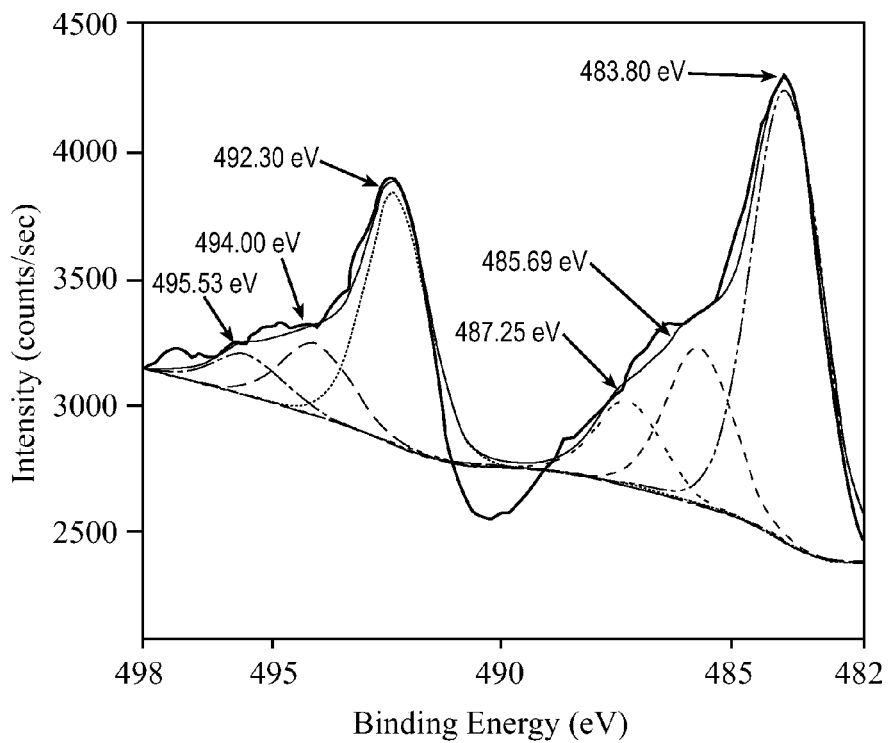
FIG. 5B is a tin x-ray photoelectron spectrum of an Sn.(LiBH$_4$)$_2$ complex synthesized by the disclosed method for synthesizing a reagent complex.

FIG. 5A shows an XPS scan of tin powder. FIG. 5B shows the corresponding XPS scan of a reagent complex synthesized therefrom, Sn.(LiBH$_4$)$_2$. Two major peaks at 495.14 and 486.72 eV and two minor peaks 493.18 and 485.03 eV in the tin powder data (FIG. 5A) shift substantially and/or disappear in the reagent complex (FIG. 5B). In their places, the reagent complex Sn.(LiBH$_4$)$_2$ has major peaks at 492.30 and 483.80 eV with minor peaks at 495.53, 494.00, 487.25 and 485.69 eV (FIG. 5B).

Figure 5C:
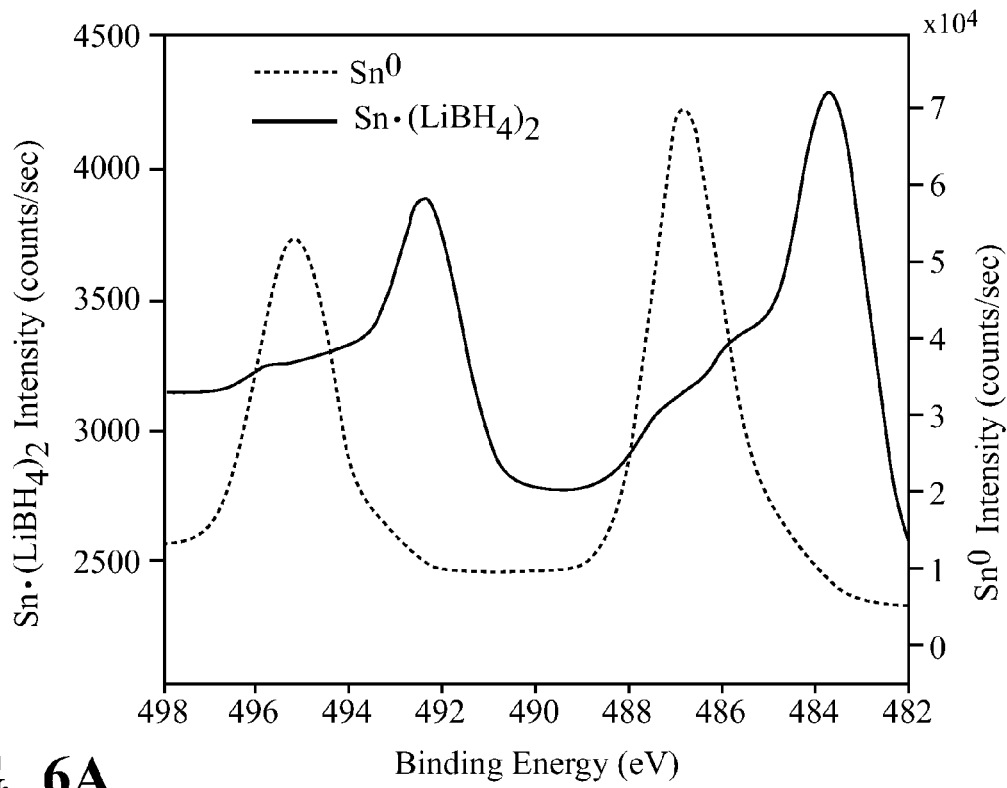
FIG. 5C is an overlay of the x-ray photoelectron spectrum of Sn$^0$ powder of FIG. 5A and the x-ray photoelectron spectrum of a Sn.(LiBH$_4$)$_2$ complex of FIG. 5B.

An overlay of the adjusted XPS data for the tin powder and the corresponding Sn.(LiBH$_4$)$_2$ reagent complex is shown in FIG. 5C. This comparison also indicates incorporation of tin into a reagent complex is accompanied by a spectral shift to lower electronic binding energies in the tin region XPS.

Figure 6A:
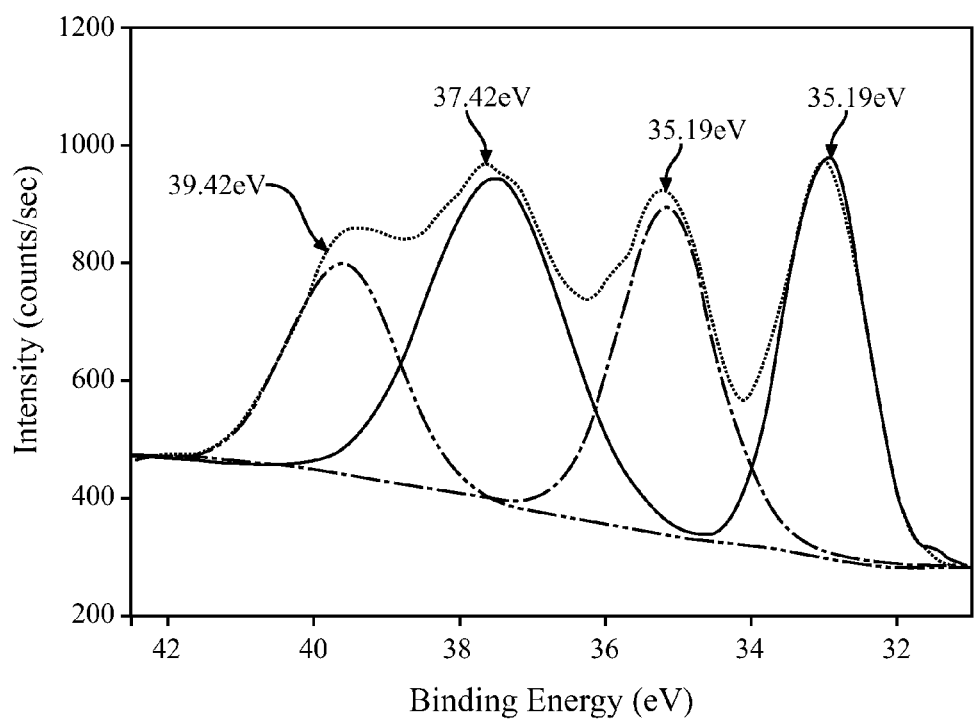
FIG. 6A is an x-ray photoelectron spectrum of W$^0$ powder.
Figure 6B:
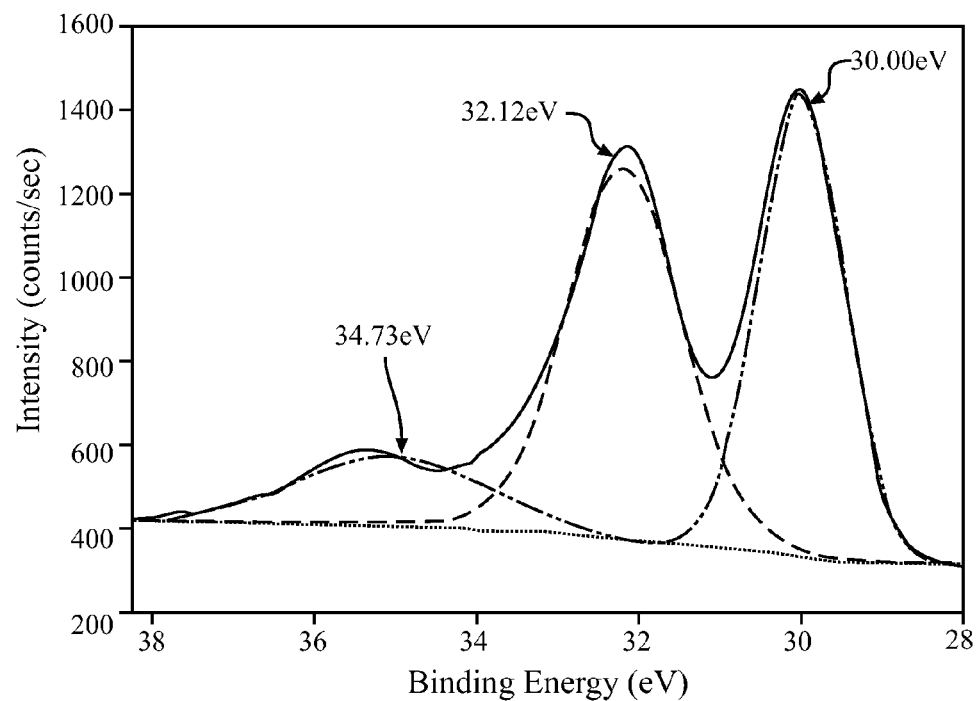
FIG. 6B is an x-ray photoelectron spectrum of a W.(LiBH$_4$)$_2$ complex synthesized by the disclosed method for synthesizing a reagent complex.
Figure 6C:
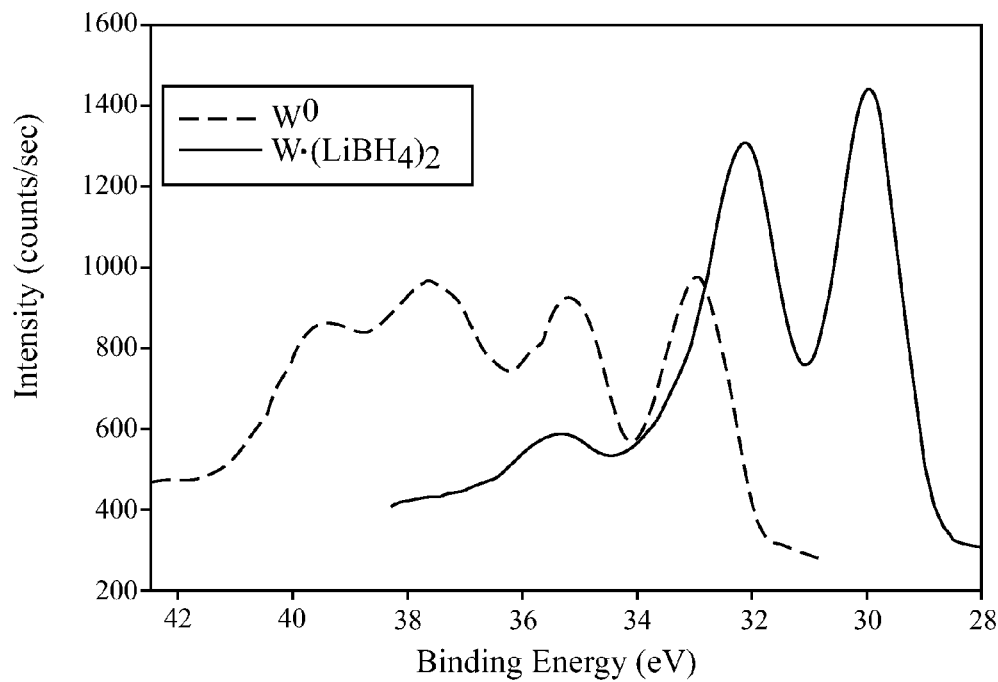
FIG. 6C is an overlay of the x-ray photoelectron spectrum of W$^0$ powder of FIG. 6A and the x-ray photoelectron spectrum of a W.(LiBH$_4$)$_2$ complex of FIG. 6B.

Referring now to FIGS. 6A and 6B, XPS spectra are shown for tungsten powder and for tungsten in complex with LiBH$_4$, respectively. The acquired spectrum is represented as a solid line while fitted component peaks are shown as various dashed and dotted lines. FIG. 6C shows the overlay of the W and the W.(LiBH$_4$)$_2$ spectra. As the results of FIG. 6C make clear, complexation of W$^0$ with LiBH$_4$ is associated with a shift to lower binding energy of valence electrons of the metallic element, as was the case for Mn$^0$ and Sn$^0$, above.

Figure 7A:
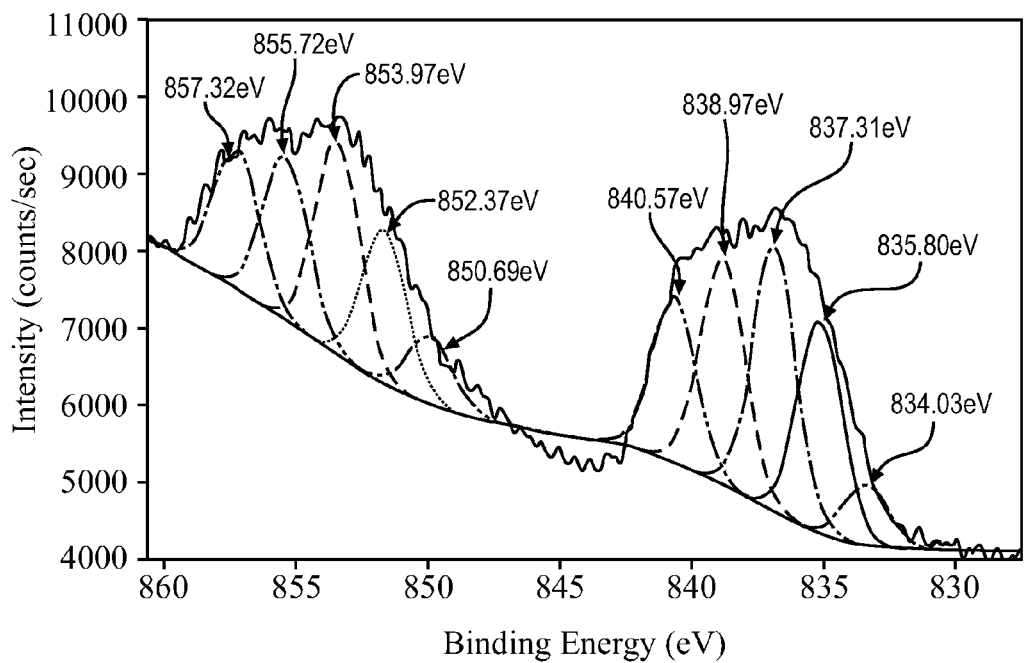
FIG. 7A is an x-ray photoelectron spectrum of La$^0$ powder.
Figure 7B:
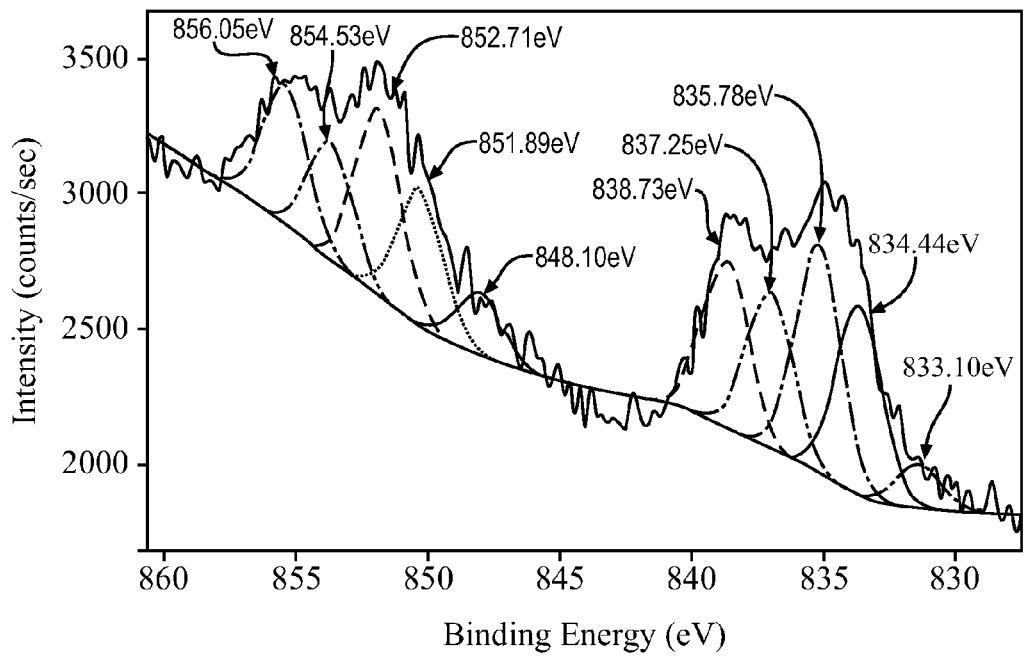
FIG. 7B is an x-ray photoelectron spectrum of a La.(LiBH$_4$)$_2$ complex synthesized by the disclosed method for synthesizing a reagent complex.
Figure 7C:
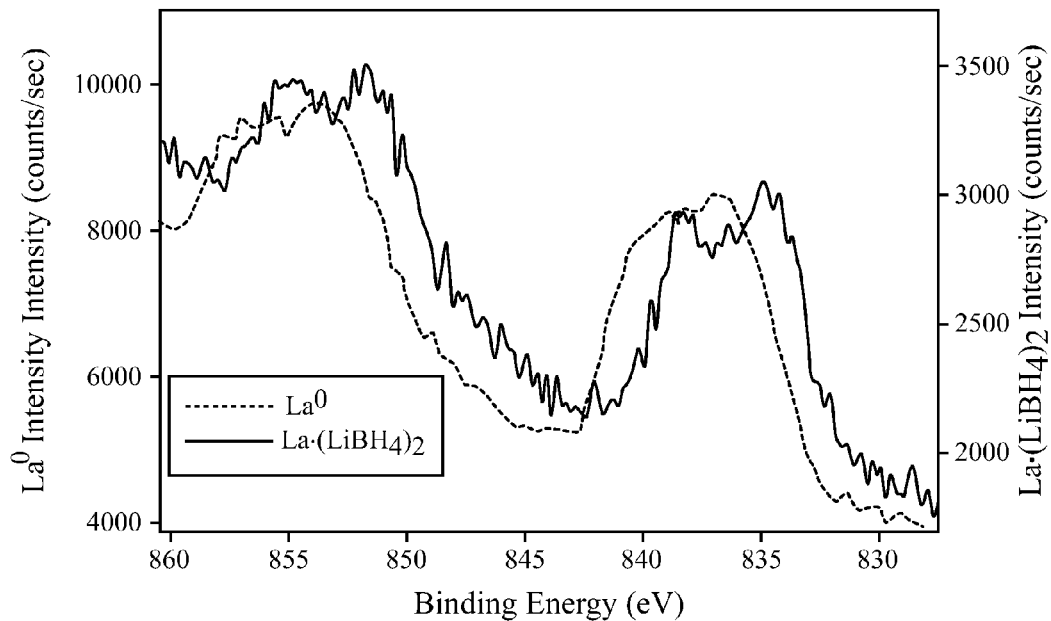
FIG. 7C is an overlay of the x-ray photoelectron spectrum of La$^0$ powder of FIG. 7A and the x-ray photoelectron spectrum of a La.(LiBH$_4$)$_2$ complex of FIG. 7B.

Referring now to FIGS. 7A and 7B, XPS spectra are shown for lanthanum powder and for the reagent complex La.(LiBH$_4$)$_2$, respectively. FIG. 7C shows an overlay of the acquired spectra of FIGS. 7A and 7B.

Figure 8A:
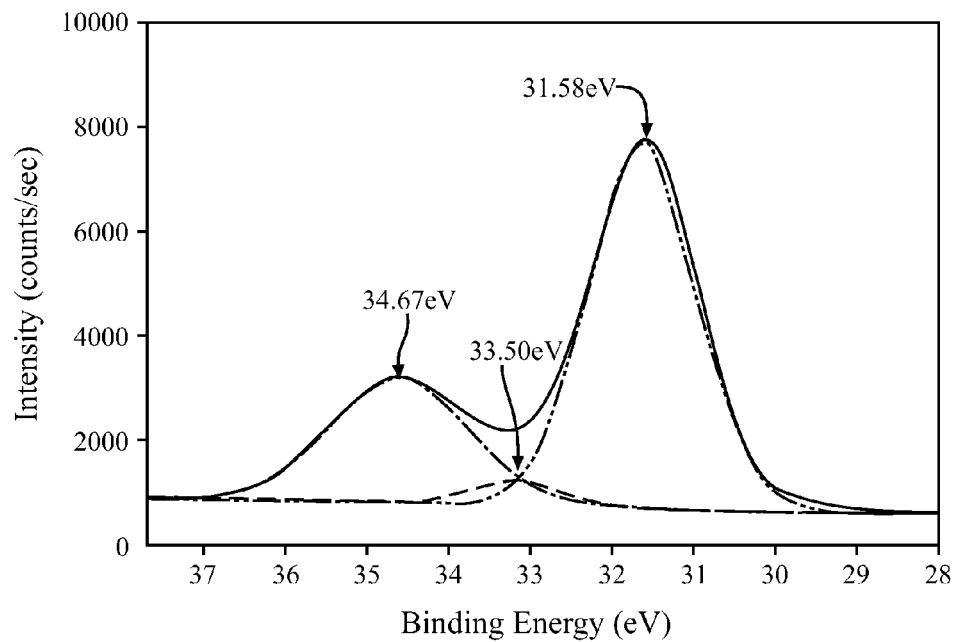
FIG. 8A is an x-ray photoelectron spectrum of Ge$^0$ powder.
Figure 8B:
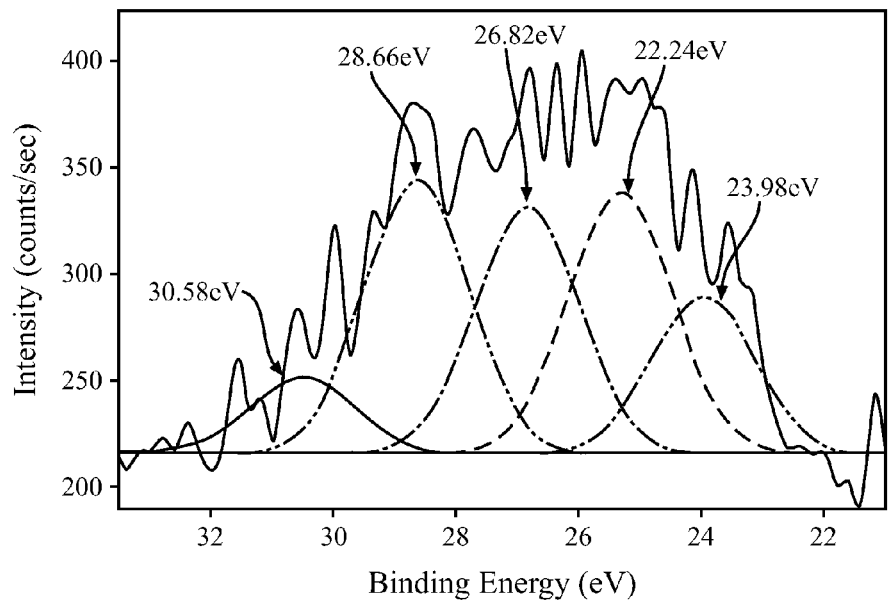
FIG. 8B is an x-ray photoelectron spectrum of a Ge.(LiBH$_4$)$_2$ complex synthesized by the disclosed method for synthesizing a reagent complex.
Figure 8C:
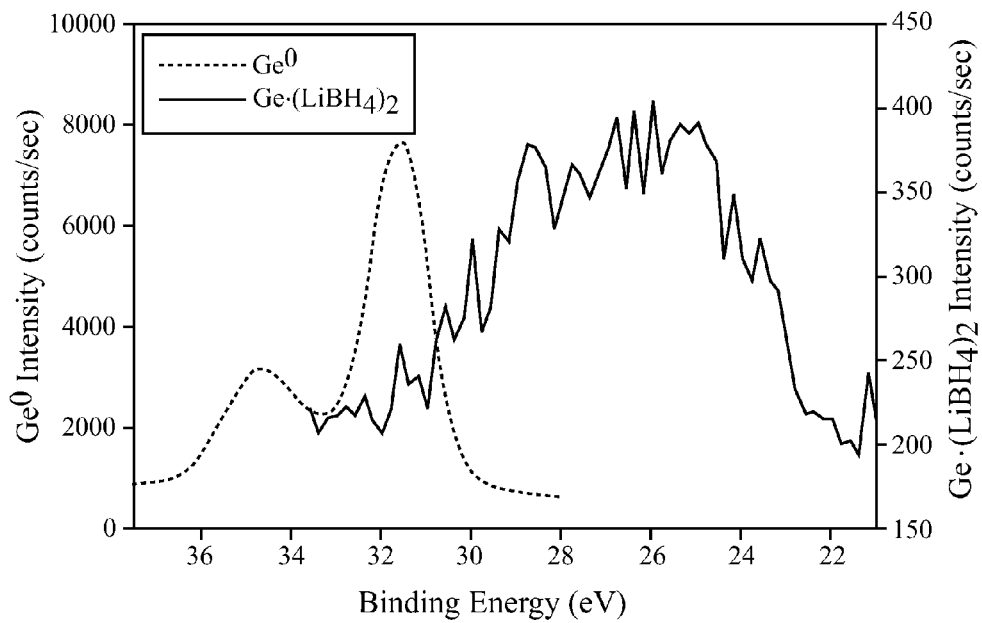
FIG. 8C is an overlay of the x-ray photoelectron spectrum of Ge$^0$ powder of FIG. 5A and the x-ray photoelectron spectrum of a Ge.(LiBH$_4$)$_2$ complex of FIG. 5B.

XPS spectra for germanium powder and for Ge.(LiBH$_4$)$_2$ reagent complex are shown in FIGS. 8A and 8B, respectively. An overlay of the acquired spectra is shown in FIG. 8C. It is to be noted that while the previous data were for various metals, the data of FIGS. 8A through 8B show complex formation where the zero-valent element is a metalloid. The shift toward lower electronic binding energies upon complex formation is similar to that observed previously.

Figure 9A:
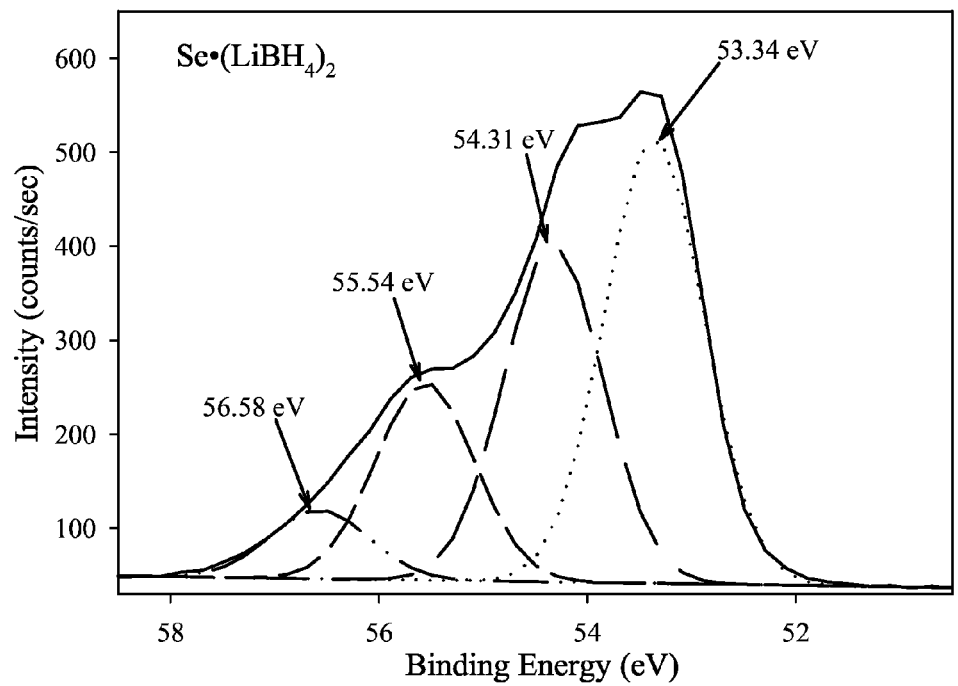
FIG. 9A is an x-ray photoelectron spectrum of a Se.(LiBH$_4$)$_2$ complex synthesized by the disclosed method for synthesizing a reagent complex.
Figure 9B:
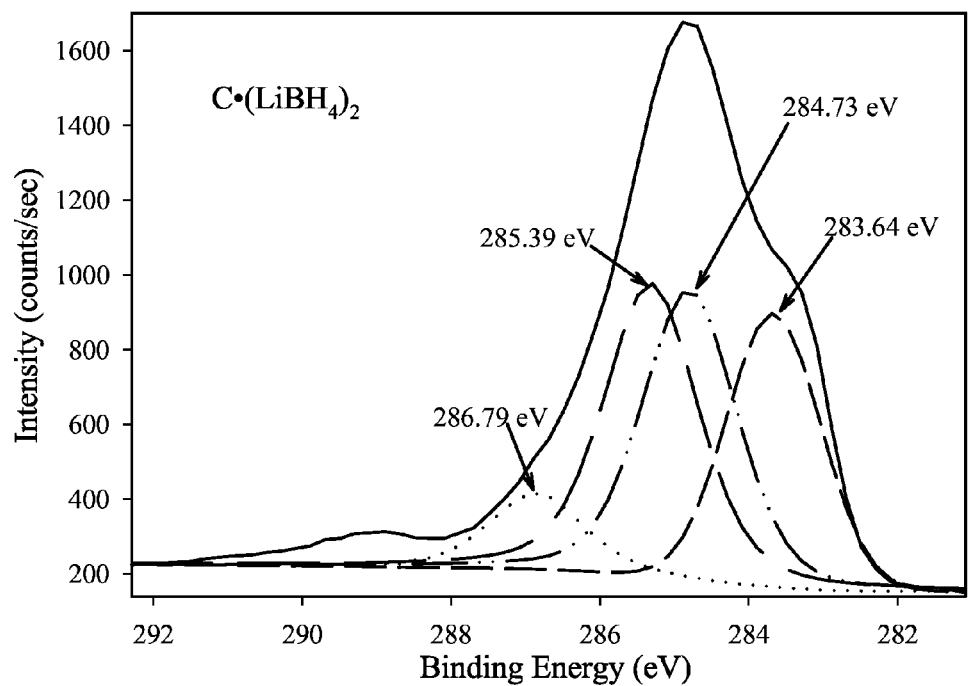
FIG. 9B is an x-ray photoelectron spectrum of a C.(LiBH$_4$)$_2$ complex synthesized by the disclosed method for synthesizing a reagent complex.

FIGS. 9A and 9B show comparable XPS spectra for two representative reagent complexes in which the zero-valent element is a non-metal. The Se.(LiBH$_4$)$_2$ complex has peaks centered at about 56.58, 55.54, 54,31, and 53.34 eV, while the C.(LiBH$_4$)$_2$ spectrum has peaks centered at about 286.79, 285.39, 284.73, and 283.64 eV. These results support the applicability of the method to non-metal elements.

Also disclosed is a reagent complex comprising a complex according to Formula I:

$$Q^0.X_y \qquad\qquad\qquad I,$$

wherein Q$^0$ is a zero-valent element, wherein X is a hydride, and wherein y is an integral or fractional value greater than zero and wherein the reagent complex is prepared by a method for synthesizing a reagent comprising the step of ball-milling a mixture which includes both a hydride and a preparation containing a zero-valent element.

In different variations of the reagent complex as prepared by the method, In different variations of the method, the zero-valent element can be a non-metal or a metallic element. In some versions of the latter, the zero-valent element can be a metal. Thus, the reagent complex as prepared by the method can more particularly comprise a complex according to any of Formulae II-IV:

$$D^0.X_y \qquad\qquad\qquad II,$$

$$E^0.X_y \qquad\qquad\qquad III,$$

$$M^0.X_y \qquad\qquad\qquad IV,$$

wherein D$^0$ is at least one non-metal atom in oxidation state zero, derived from a preparation containing a zero-valent non-metal, wherein E$^0$ is at least one atom of a metallic element in oxidation state zero, derived from a preparation containing a zero-valent metallic element, wherein M$^0$ is at least one metal atom in oxidation state zero, derived from a preparation containing a zero-valent metal, and wherein X and y are as defined above.

In various aspects, the hydride as incorporated in the reagent complex as prepared by the method can be any hydride, including binary metal hydride, binary metalloid hydride, complex metal hydride, or complex metalloid hydride. In some variations, the hydride can be a complex metalloid hydride. In some instances, the hydride can be a borohydride. In some instanced, the hydride can be lithium borohydride.

The value y according to Formula I can define the stoichiometry of hydride molecules to zero-valent elemental atoms in the reagent complex. The value of y can include any integral or fractional value greater than zero. In some instances, y can be an integral or fractional value less than or equal to four. In some instances, y can be an integral or fractional value less than or equal to two. In some instances, y can be an integral or fractional value less than or equal to one.

The preparation containing a zero-valent element can be any composition consisting substantially of a zero-valent element. In many instances the preparation containing a zero-valent element will include zero-valent element in a form which possesses a high surface-area-to-mass ratio. In some instances the zero-valent element will be present in a powder form with a particulate size of −325 mesh. It is contemplated that the preparation containing a zero-valent element can be a highly porous zero-valent element, a zero-valent element with a honeycomb structure, or some other preparation with a high surface-area-to-mass ratio.

The present invention is further illustrated with respect to the following examples. It needs to be understood that these examples are provided to illustrate specific embodiments of the present invention and should not be construed as limiting the scope of the present invention.

EXAMPLE 1

One part manganese metal powder, of −325 mesh particle size, is mixed with one part or two parts LiBH$_4$, of total manganese metal and lithium borohydride powder mass of less than 10 grams, and ball-milled in a planetary ball-mill for 4 hours at 400 rpm (using a Fritsch pulverisette 7 planetary ball mill) in a 250 mL stainless steel airtight ball-mill jar with one ¾ inch, three ½ inch, and five ¼ inch 316 stainless steel ball bearings.

EXAMPLE 2.

One part tin metal powder, of −325 mesh particle size, is mixed with one part or two parts $LiBH_4$, of total tin metal and lithium borohydride powder mass of less than 10 grams, and ball-milled in a planetary ball-mill for 4 hours at 400 rpm (using a Fritsch pulerisette 7 planetary ball mill) in a 250 mL stainless steel airtight ball-mill jar with 1¾ inch, 3½ inch, and 5¼ inch 316 stainless steel ball bearings.

EXAMPLE 3

Tungsten powder and lithium borohydride powder are added, in a 1:2 stoichiometric ratio, to a stainless steel ball mill under argon, with steel balls. This mixture is then milled in a planetary ball mill at 150 to 400 rpm (depending on hardness of metal) for 4 hours.

EXAMPLE 4

Lanthanum powder and lithium borohydride powder are added, in a 1:2 stoichiometric ratio, to a stainless steel ball mill under argon, with steel balls. This mixture is then milled in a planetary ball mill at 150 to 400 rpm (depending on hardness of metal) for 4 hours.

EXAMPLE 5

Germanium powder and lithium borohydride powder are added, in a 1:2 stoichiometric ratio, to a stainless steel ball mill under argon, with steel balls. This mixture is then milled in a planetary ball mill at 150 to 400 rpm (depending on hardness of metal) for 4 hours.

EXAMPLES 6-7

Lithium borohydride powder is added, along with selenium or carbon powder, in a 2:1 stoichiometric ratio, to a stainless steel ball mill under argon, with steel balls. This mixture is then milled in a planetary ball mill at 150 to 400 rpm (depending on hardness of metal) for 4 hours.

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A reagent complex comprising a complex according to a formula, $$Q^0 \cdot X_y$$

wherein $Q^0$ is a zero-valent element having oxidation state zero; X is a hydride comprising at least one of a binary metalloid hydride, a complex metal hydride, and a complex metalloid hydride; and y is an integral or fractional value greater than zero.

2. A reagent complex comprising a complex according to a formula, $$Q^0 \cdot X_y$$

wherein $Q^0$ is a zero-valent non-metal; X is a hydride; and y is an integral or fractional value greater than zero.

3. The reagent complex of claim 2 wherein the non-metal is carbon or selenium.

4. The reagent complex of claim 1 wherein the hydride comprises a borohydride.

5. The reagent complex of claim 1 wherein the hydride comprises lithium borohydride.

6. The reagent complex of claim 1 wherein y is about 4 or less.

7. A method for synthesizing a reagent complex, comprising:
    ball-milling a mixture that includes:
        a hydride comprising at least one of a binary metalloid hydride, a complex metal hydride, and a complex metalloid hydride; and
        a preparation containing a zero-valent element having oxidation state zero; and
    producing a reagent complex according to a formula:

$$Q^0 \cdot X_y$$

wherein $Q^0$ is the zero-valent element having oxidation state zero; X is the at least one of a binary metalloid hydride, a complex metal hydride, and a complex metalloid hydride; and y is an integral or fractional value greater than zero.

8. The method of claim 7 wherein the hydride comprises a borohydride.

9. The method of claim 7 wherein the hydride comprises lithium borohydride.

10. The method of claim 7 wherein the hydride is mixed with the preparation containing a zero-valent element in about four-fold or lower molar excess.

11. The method of claim 7 wherein ball-milling is performed in a planetary ball mill for about 4 hours at about 400 rpm in a stainless steel airtight ball-mill jar with one ¾inch, three ½ inch, and five ¼ inch 316 stainless steel ball bearings.

12. The method of claim 7 which is performed in an oxygen-free environment, in an anhydrous environment, or in an environment that is oxygen-free and anhydrous.

13. A method for synthesizing a reagent complex, comprising:
    ball-milling a mixture that includes both a hydride and a preparation containing a zero-valent non-metal.

14. The method of claim 13 wherein the preparation containing a zero-valent non-metal is a preparation containing carbon or selenium.

15. A reagent complex prepared by a method comprising:
    ball-milling a mixture that includes:
        a hydride comprising at least one of a binary metalloid hydride, a complex metal hydride, and a complex metalloid hydride; and
        a preparation containing a zero-valent element having oxidation state zero; and
    producing a reagent complex according to a formula:

$$Q^0 \cdot X_y$$

wherein $Q^0$ is the zero-valent element having oxidation state zero; X is the at least one of a binary metalloid hydride, a complex metal hydride, and a complex metalloid hydride; and y is an integral or fractional value greater than zero.

16. The reagent complex of claim 15 wherein the hydride comprises a borohydride.

17. The reagent complex of claim 15 wherein the hydride comprises lithium borohydride.

18. The reagent complex of claim 15 wherein the method is performed in an oxygen-free environment, in an anhydrous environment, or in an environment that is oxygen-free and anhydrous.

19. A reagent complex prepared by a method comprising:
ball-milling a mixture that includes both a hydride and a preparation containing a zero-valent non-metal.

20. The reagent complex of claim 19 wherein the preparation containing a zero-valent non-metal is a preparation containing carbon or selenium.

* * * * *